No. 637,056. Patented Nov. 14, 1899.
C. E. WHITNEY.
CHAIN SPROCKET.
(Application filed Dec. 31, 1898.)

(No Model.)

Witnesses:
H. Mallner
Jennie Nellis

Inventor
Clarence E. Whitney
By his Atty. W. H. Honiss

UNITED STATES PATENT OFFICE.

CLARENCE E. WHITNEY, OF HARTFORD, CONNECTICUT, ASSIGNOR TO THE WHITNEY MANUFACTURING COMPANY, OF SAME PLACE.

CHAIN-SPROCKET.

SPECIFICATION forming part of Letters Patent No. 637,056, dated November 14, 1899.

Application filed December 31, 1898. Serial No. 700,797. (No model.)

*To all whom it may concern:*

Be it known that I, CLARENCE E. WHITNEY, a citizen of the United States of America, and a resident of Hartford, in the county of Hartford and State of Connecticut, have invented certain new and useful Improvements in Chain-Sprockets, of which the following is a specification.

This invention relates to improvements in chain-and-sprocket driving apparatus, the general object of the invention being to provide an improved system of sprockets having teeth of uniform outline upon all of the sprockets of the series for simplicity and convenience in manufacture and for reducing the weight and cost of the sprocket-wheels, while enabling any number of sprocket-wheels of all diameters to work together correctly with the same chain.

The more specific objects of the invention are to reduce the friction of contact between the chain and sprocket, to make the teeth of cylindrical form and of uniform diameter upon all sprockets of a series, and to enable these cylindrical teeth to be manufactured in large quantities and to be carried in stock and even to be sold as distinct commercial articles, if found to be desirable, since they may be employed equally well for new work or for repairs.

Figure 1:
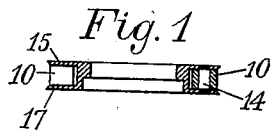
Figure 3:
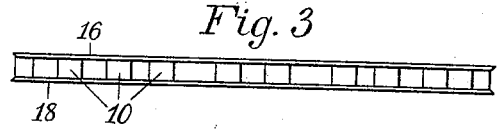
Figure 2:
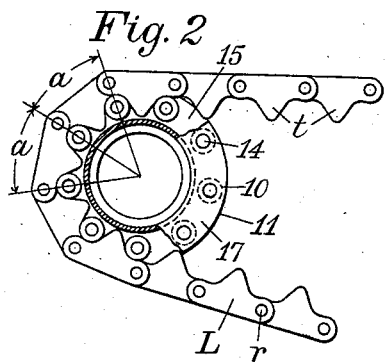
Figure 4:
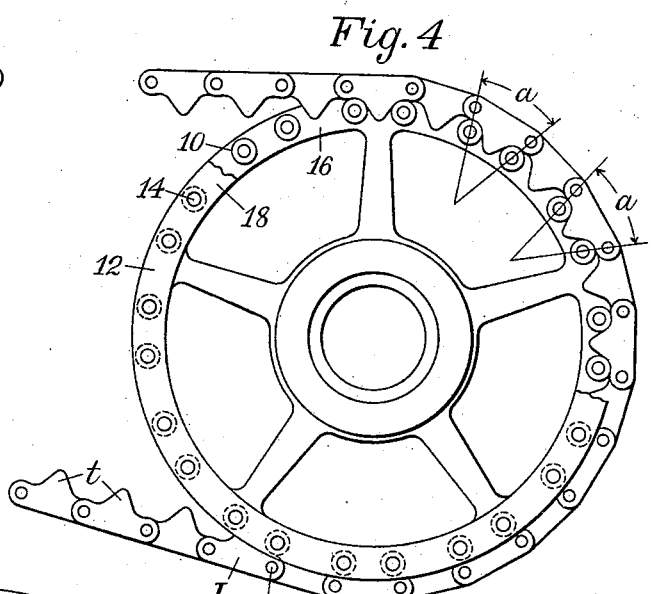
Figure 5:
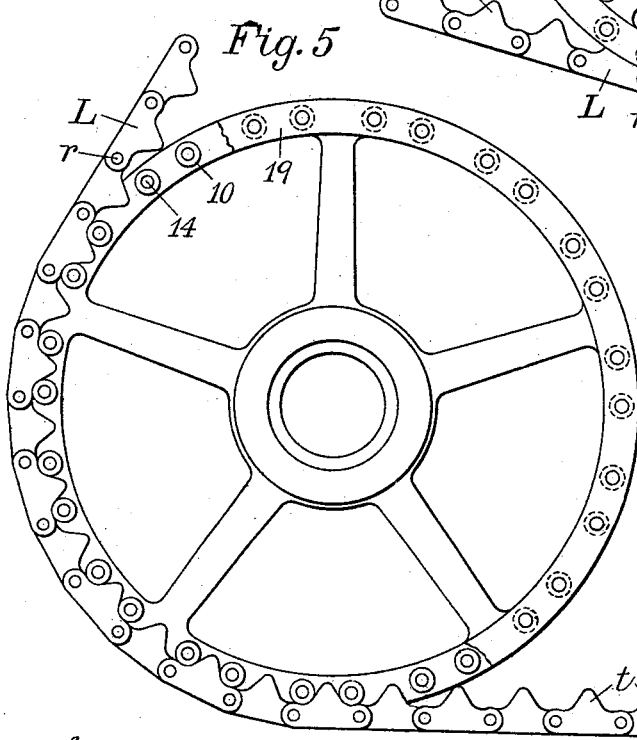
Figure 6:
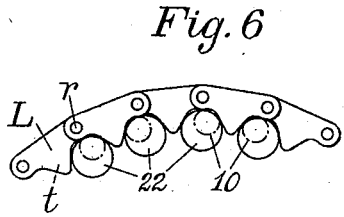
Figure 7:
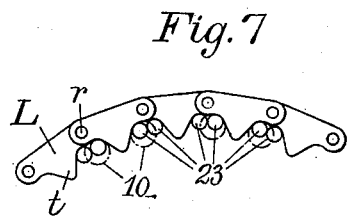

Figure 1 of the drawings is a sectional plan view, and Fig. 2 is a side view, showing the smallest sprocket of a series embodying my present improvements. In Fig. 2 is also represented a chain to which this particular embodiment of my invention is adapted. Fig. 3 is a plan view, and Fig. 4 a side view, of a larger sprocket of the same series, Fig. 4 showing also a portion of chain like that of Fig. 2. Fig. 5 is a side view showing a still larger sprocket adapted to run in series with the sprocket of Figs. 2 or 4 or with both of them. Fig. 6 is a side view of a fragment of the chain of Figs. 2, 4, and 5, showing in connection therewith cylindrical sprocket-teeth of a size which would be required to fill the spaces between the teeth of the chain on a sprocket-wheel of the size shown in Fig. 4. Fig. 7 is a side view of a similar fragment of the driving-chain, showing in connection therewith sprocket-teeth arranged in pairs to fill each space of the chain.

The embodiment of my present invention which is shown in the drawings and which will be described herein is adapted to coöperate with a chain of the class shown in the figures, consisting of the links L, which are pivotally connected by means of the rivets $r$. Each of the links is provided with an inwardly-projecting tooth $t$, located substantially midway of its length. The joints of the links may be formed in any one of several well-known ways—as, for example, by counterboring or by the use of alternate single and double links riveted together. This embodiment is in a form suitable for driving bicycles, for which purpose it is primarily intended, although applicable to other uses.

In arranging a series of sprocket-wheels to engage with and drive or be driven by the chain I provide the smallest sprocket of the intended series with a peripheral series of teeth 10, equally spaced around the pitch-circle thereof. These teeth 10, which are herein shown to be of my preferred cylindrical form, are made of a size and strength adapted to transmit the desired driving strain. Each tooth $t$ of the chain is made of a width and outline suitable for entering between the teeth 10 of the smallest sprocket, the adjacent teeth $t$ closing upon the opposite sides of each of the teeth 10 of the smallest sprocket-wheel as the chain wraps thereon, thereby bringing the pivotal joints of the links outside of and in radial relation to each of the teeth 10. The bases of the teeth $t$ preferably describe the arc of a circle of a radius equaling that of the teeth 10, so as to form seats, which in the smallest sprocket (shown in Fig. 2) coincides with nearly one-half of the circumference of the tooth-pins 10. The larger sprocket 12 of Figs. 3 and 4 is provided with similar teeth, which, as herein shown, consists of cylindrical pins 10 of the same diameter as the pins of Fig. 2, and those pins are spaced in pairs around the pitch-circle of the sprocket 12, the members of each pair being located so as to engage between them the teeth of the alternate links L of the driving-chain. The pitch interval between the members of each pair is exactly like the uniform pitch interval between the pins 10 of Fig. 2, while the pitch interval between each of the pairs of pins is increased by a proportionate part of the increased circumference of the sprocket 12 over that of the sprocket 11, this increased circumference of the larger sprocket being equally distributed at the pitch intervals between the pairs of teeth. This disposition of the pins 10 upon the larger sprocket or sprockets is the same as though the pins of the smaller sprocket were carried therefrom in pairs by the chain and so deposited upon the pitch-line of the larger sprocket, the increased distance between the pairs and the consequent disengagement with the alternate chain-teeth being due to the opening out of the links to suit the larger radius of the pitch-circle of that larger sprocket. Therefore the angle $a$ of the alternate links and their respective pairs of pins 10 of the larger sprocket is the same as the corresponding angle of each and every link in relation to the pins 10 of the smaller sprocket 11.

The teeth of the sprocket-wheels are preferably cylindrical in form, and in the preferred construction shown herein they consist of cylindrical rolls 10, which turn freely on shouldered pins 14, which are riveted at one end to the flanges 15 and 16 of the sprockets 11 and 12, respectively. I also preferably employ annular flanges, as 17, 18, and 19, to which the opposite ends of the shouldered pins 14 are also riveted, and which thereby serve not only to safely inclose the rolls, but also to retain the chain in the plane of the sprocket-wheels. These flanges are partially broken away in Figs. 2, 4, and 5, so as to show more clearly the relation of the sprocket-pins to the links of the chain.

In Fig. 6 is shown a fragment of chain as applied to a sprocket-wheel having the same effective pitch-diameter as that of Fig. 4, representing in connection therewith cylindrical pins 22 of the larger size required to fill the interval between the teeth of the chain, so as to prevent undue backlash, and showing by comparison with the superimposed dot-and-dash circles of the pin 10 of Figs. 2 and 4 the reduction in size and consequently in weight made possible by the arrangement of the present invention. Fig. 7 represents a similar fragment of chain and of a sprocket provided with cylindrical teeth 23 of a diameter small enough to permit them to be used in pairs, arranged to fill each link-space of the chain, illustrating by comparison with the superimposed dot-and-dash circles of the teeth 10 the reduction of one-half in the number of teeth and the increase in size and strength thereof made possible by the arrangement of the present invention. This reduction of one-half in number correspondingly reduces the cost and labor of making the teeth and of riveting them in place. In neither of the arrangements shown in Figs. 6 and 7 can the teeth 22 or 23, respectively, be thus made uniform in size upon all the sprockets in the series.

A further important advantage of having the sprocket-teeth uniform in size and outline upon all the sprockets of a series is also illustrated in Figs. 6 and 7—namely, in that all of the teeth may thereby be made to exactly fit the teeth of the chain, as shown in Figs. 2, 4, and 5, whereas the links if made to fit the teeth of one diameter or outline, as 10, would obviously not coincide with the outlines of teeth of a different diameter or outline, as 22 or 23, but would have only a line contact therewith, thereby tending to wear and deform the teeth of the sprockets and the chain much more rapidly.

Another important advantage arising from the uniformity in size and outline of all the teeth in a series of sprockets, especially when made in cylindrical form, as herein shown, is that they may be manufactured in large quantities at very small cost by means of a screw-machine or any other approved method of manufacture and may be kept in stock for use as required, either for the making of new sprockets or for repairs, without regard to the size of the sprocket to which they may be applied. This arrangement of the pins 10 upon the opposite sides of the teeth $t$ of the alternate links of the chain serves as effectually as though located in corresponding engagement with each link thereof, as in Fig. 2, or, as shown in Fig. 6, by the use of the larger pin, since a sufficient number of pins are in driving contact in both directions of rotation, being therefore perfectly well adapted for driving or holding in either direction, as is sometimes required in the use of these chains, especially when used in connection with cycles for back-pedaling. Any sprocket of the series may be used as a driver or may be employed merely as an idler, as may best suit the particular use for which they are employed. If the smaller pins 10 are sufficiently large to bear the strain imposed upon five of them in the smaller sprocket 11, it is obvious that a larger pin is not required to withstand the similar strain, which in the larger sprocket 12 of Fig. 4 is distributed over seven of those pins. Thus it is obvious that no loss in driving capacity is suffered by the lack of contact with the alternate links. Furthermore, those alternate links which do not engage with the pins of the larger sprockets are thereby freed from a corresponding amount of friction.

The terms "pitch" and "pitch interval" are herein employed to designate the distance between the centers of the teeth measured along the chords of their respective arcs. The lengths of the arcs vary with their respective radii, but the chordal pitch is uniform between the two members of each and every pair of teeth of all the wheels comprised in the system without regard to the diameters of those wheels. Therefore all sprocket-wheels having their teeth arranged upon this system will work together. For example, the chain shown in the drawings will work correctly upon any two or all three of the sprocket-wheels shown or upon any number of sprocket-wheels of whatever diameter upon which the teeth are arranged in accordance with this system.

I claim as my invention—

1. In combination with a chain, a sprocket-wheel therefor provided with teeth arranged in pairs in engaging relation to the alternate links only of the chain.

2. In combination with a chain of the class specified, a sprocket-wheel provided with a single circle of teeth, one wheel-tooth for each tooth interval of the chain, the sprocket-teeth being arranged in pairs in engaging relation to the alternate links only of the chain.

3. In combination with a chain of the class specified, a plurality of sprocket-wheels each provided with a circle of teeth arranged in pairs in engaging relation to the alternate links only of the chain, the chordal pitch interval between the members of each pair being uniform upon all the wheels, and the differences in pitch-circumference of the wheels being distributed equally at the pitch intervals between their respective pairs of teeth.

4. In combination with a chain, a relatively small sprocket-wheel provided with an equally-spaced circle of teeth, and a larger sprocket-wheel provided with teeth arranged in pairs, the chordal pitch interval between the members of each pair of teeth of the larger wheel being equal to that of the teeth of the small wheel, and the increased circumference of the larger wheel being equally distributed at the pitch intervals between the pairs of teeth.

5. In combination with a chain, a set of sprocket-wheels of unequal diameters provided with cylindrical teeth of equal diameter, which teeth are equidistantly spaced around the periphery of the smallest wheel, and are arranged in pairs upon the larger wheel or wheels in the same relation to the alternate links of the chain as that borne to each link of the chain by its two adjacent engaging teeth of the smallest wheel.

6. The combination of a chain, and a pair of sprocket-wheels of unequal diameters provided with cylindrical chain-engaging teeth of equal diameter, which upon the smaller wheel are arranged in radial relation to each of the joints of the chain, and are arranged upon the larger wheel in pairs in similar engaging relation to the alternate links only of the chain, the chordal pitch interval between the members of each pair being equal to that of the teeth of the smaller wheel, and the increased circumference of the large wheel being equally distributed at the pitch intervals between the pairs of teeth thereof.

Signed by me at Hartford, Connecticut, this 22d day of November, 1898.

CLARENCE E. WHITNEY.

Witnesses:
JENNIE NELLIS,
W. H. HONISS.